US 6,575,694 B1

(12) United States Patent
Thompson et al.

(10) Patent No.: US 6,575,694 B1
(45) Date of Patent: Jun. 10, 2003

(54) GAS TURBINE ENGINE BLADE CONTAINMENT ASSEMBLY

(75) Inventors: Ewan F Thompson, Derby (GB); Ian G Martindale, Derby (GB); David S Knott, Loughborough (GB); Kenneth F Udall, Derby (GB); David Geary, Derby (GB); Julian M Reed, Derby (GB); Sivasubramaniam K Sathianathan, Burton on Trent (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/924,104

(22) Filed: Aug. 8, 2001

(30) Foreign Application Priority Data

Aug. 11, 2000 (GB) ............................. 0019664
Aug. 12, 2000 (GB) ............................. 0019803

(51) Int. Cl.$^7$ .............................. F01D 21/00
(52) U.S. Cl. ................. 415/9; 415/173.4; 415/200
(58) Field of Search ................... 415/9, 200, 173.4

(56) References Cited

U.S. PATENT DOCUMENTS

| 1,698,514 A | * | 1/1929 | Schmidt |
| 2,994,124 A | * | 8/1961 | Denny et al. |
| 3,974,313 A |   | 8/1976 | James |
| 4,017,207 A | * | 4/1977 | Bell et al. ................. 415/115 |
| 4,063,742 A | * | 12/1977 | Watkins, Jr. ................. 277/53 |
| 4,135,851 A | * | 1/1979 | Bill et al. ................. 415/174 |
| 4,149,824 A | * | 4/1979 | Adamson ..................... 415/9 |
| 4,191,510 A | * | 3/1980 | Teysseyre et al. .......... 416/230 |
| RE30,600 E | * | 5/1981 | Long et al. ................. 277/96.1 |
| 4,618,152 A | * | 10/1986 | Campbell ..................... 277/53 |
| 4,762,462 A |   | 8/1988 | Lardelier |
| 5,167,488 A | * | 12/1992 | Ciokajlo et al. ............. 415/175 |
| 6,182,531 B1 | * | 2/2001 | Gallagher et al. ............. 74/572 |
| 6,394,746 B1 | * | 5/2002 | Sathianathan et al. ......... 415/9 |

FOREIGN PATENT DOCUMENTS

| GB | 1500135 P | 2/1978 |
| GB | 1533017 P | 11/1978 |

* cited by examiner

Primary Examiner—Edward K. Look
Assistant Examiner—James M McAleenan
(74) Attorney, Agent, or Firm—W. Warren Taltavull; Manelli, Denison & Selter PLLC

(57) ABSTRACT

A turbofan gas turbine engine (10) comprises a fan rotor (32) carrying a plurality of radially extending fan blades (34). A fan blade containment assembly (38) surrounds the fan blades (34) and the fan blade containment assembly (34) comprises a generally annular, or frustoconical, cross-section casing (52). At least one corrugated sheet metal ring surrounds the casing (52) wherein the corrugations extend with axial and/or circumferential components.

26 Claims, 11 Drawing Sheets

GAS TURBINE ENGINE BLADE CONTAINMENT ASSEMBLY

FIELD OF THE INVENTION

The present invention relates to gas turbine engine casings, particularly gas turbine engine fan casings and turbine casings, more particularly to an improved blade containment assembly for use within or forming a part of the gas turbine engine casing.

BACKGROUND OF THE INVENTION

Turbofan gas turbine engines for powering aircraft conventionally comprise a core engine, which drives a fan. The fan comprises a number of radially extending fan blades mounted on a fan rotor enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment casings. It is known to provide generally cylindrical, or frustoconical, locally thickened, isogrid, metallic containment casings. It is known to provide strong fibrous material wound around relatively thin metallic casings or around the above mentioned containment casings. In the event that a blade becomes detached it passes through the casing and is contained by the fibrous material.

However, the relatively thick containment casings are relatively heavy, the relatively thin casings enclosed by the fibrous material are lighter but are more expensive to manufacture. The relatively thick casings with fibrous material are both heavier and more expensive to manufacture.

SUMMARY OF THE INVENTION

Accordingly the present invention seeks to provide a novel gas turbine engine casing which overcomes the above mentioned problems.

Accordingly the present invention a gas turbine engine blade containment assembly comprising a generally cylindrical, or frustoconical, casing, the casing being arranged in operation to surround a rotor carrying a plurality of radially extending rotor blades, and at least one corrugated metal sheet surrounding the casing, wherein the corrugations of the at least one corrugated metal sheet extend with axial and/or circumferential components. The at least one corrugated metal sheet may comprise at least one corrugated metal ring. Alternatively the at least one corrugated metal sheet comprises at least one corrugated metal sheet wound into a spiral.

Preferably the casing is a fan casing and the rotor blades are fan blades.

Alternatively the casing may be a turbine casing and the rotor blades are turbine blades.

Preferably the corrugations are equi-spaced.

The corrugations in the at least one corrugated metal sheet may extend with purely axial components. The corrugations in the at least one corrugated metal sheet may extend with purely circumferential components. Preferably the corrugations in the at least one corrugated metal sheet extend with both axial and circumferential components.

The casing may comprise a single corrugated metal sheet wound into a ring.

The casing may comprise a plurality of corrugated metal sheets, each of which is wound into a ring.

The corrugations in different corrugated metal sheets may be arranged to extend at different angles.

The corrugations in a first corrugated metal sheet may be arranged to extend with purely axial components and the corrugations in a second corrugated metal sheet are arranged to extend with purely circumferential components.

The corrugations in a first corrugated metal sheet may be arranged to extend with purely axial components and the corrugations in a second corrugated metal sheet are arranged to extend with axial and circumferential components.

The corrugations in a first corrugated metal sheet may be arranged to extend with purely circumferential components and the corrugations in a second corrugated metal sheet are arranged to extend with axial and circumferential components.

Preferably the corrugations in a first corrugated metal sheet are arranged to extend with axial and circumferential components and the corrugations in a second corrugated metal sheet are arranged to extend with axial and circumferential components.

The at least one corrugated metal sheet may be provided with apertures therethrough to attenuate noise.

The casing may comprise a single corrugated metal sheet wound into a spiral.

The casing may comprise a plurality of corrugated metal sheets, each of which is wound into a spiral.

The corrugations in different metal sheets may be arranged to extend at different angles.

The corrugations in a first corrugated metal sheet may be arranged to extend with purely circumferential components and the corrugations in a second corrugated sheet are arranged to extend with purely axial components.

The corrugations in a first corrugated metal sheet may be arranged to extend with purely circumferential components and the corrugations in a second corrugated metal sheet are arranged to extend with both axial and circumferential components.

The plurality of corrugated metal sheets define spaces therebetween, the spaces may be filled with an energy absorbing material to increase the blade containment capability of the casing.

The plurality of corrugated metal sheets wound into spirals define spaces therebetween, the spaces may be filled with an energy absorbing material to increase the blade containment capability of the casing.

The at least one corrugated metal sheet wound into a spiral defines spaces therebetween, the spaces may be filled with an energy absorbing material to increase the blade containment capability of the casing.

Preferably the at least one corrugated metal sheet is formed from titanium, an alloy of titanium, aluminium or steel.

BRIEF DESCRIPTION OF THE DRAWINGS

The present invention will be more fully described by way of example with reference to the accompanying drawings in which.

DETAILED DESCRIPTION OF THE INVENTION

Figure 1:
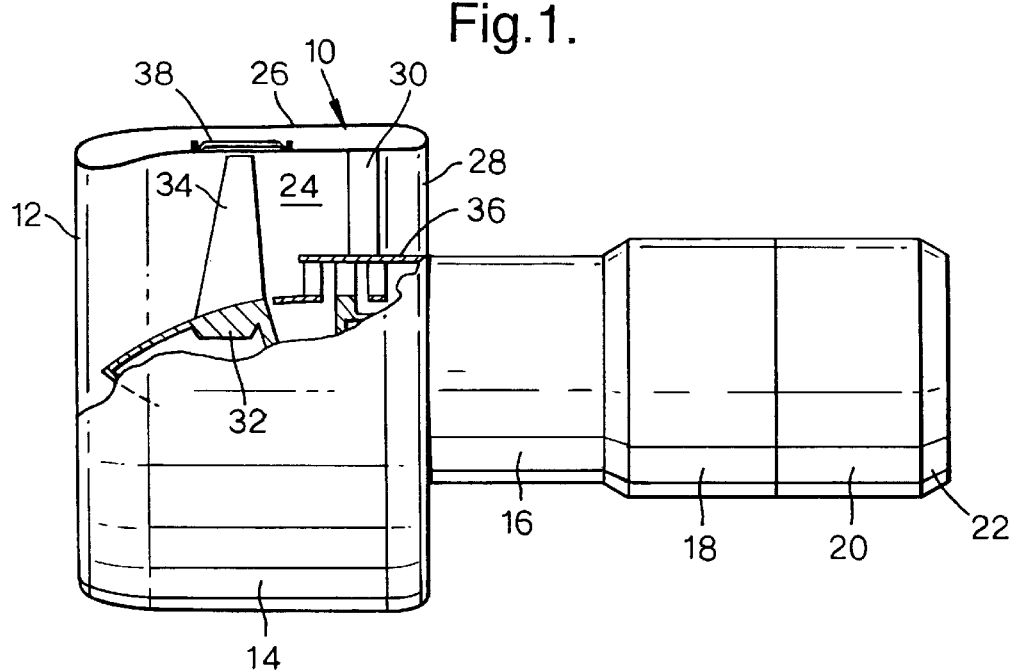
FIG. 1 is a partially cut away view of a gas turbine engine having a fan blade containment assembly according to the present invention.
Figure 2:
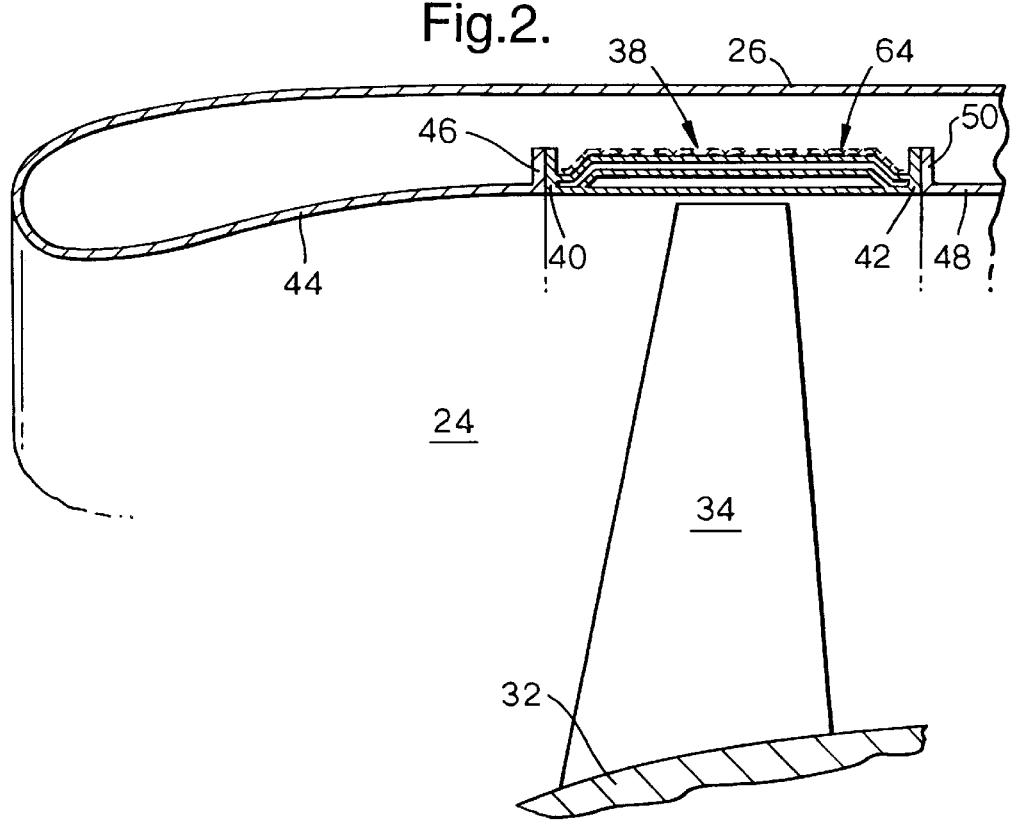
FIG. 2 is an enlarged view of the fan blade containment assembly shown in FIG. 1.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts.

The turbine section 20 also comprises a turbine to drive the fan section 14 via a shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing 26 surrounds a fan rotor 32 which carries a plurality of circumferentially spaced radially extending fan blades 34. The fan casing 26 also comprises a fan blade containment assembly 38, which is arranged substantially in the plane of the fan blades 34.

The fan casing 26 and fan blade containment assembly 38 are shown more clearly in FIGS. 2 to 7. The fan blade containment assembly 38 comprises an upstream flange 40 by which the fan blade containment assembly 38 is connected to a flange 46 on an intake assembly 44 of the fan casing 26 and the fan blade containment assembly 38 has a downstream flange 42 by which the fan blade containment assembly 38 is connected to a flange 50 on a rear portion 48 of the fan casing 26.

Figure 3:
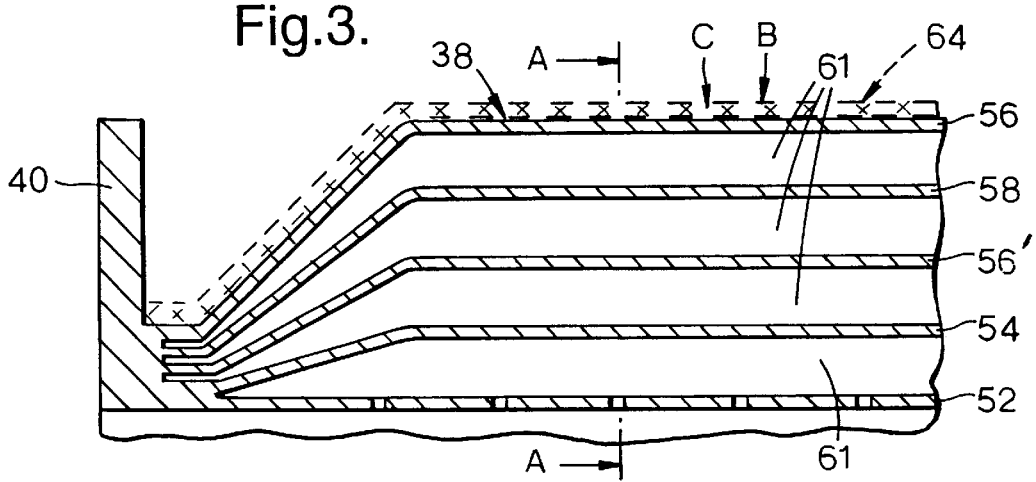
FIG. 3 is a further enlarged view of the fan blade containment assembly shown in FIG. 2.
Figure 4:
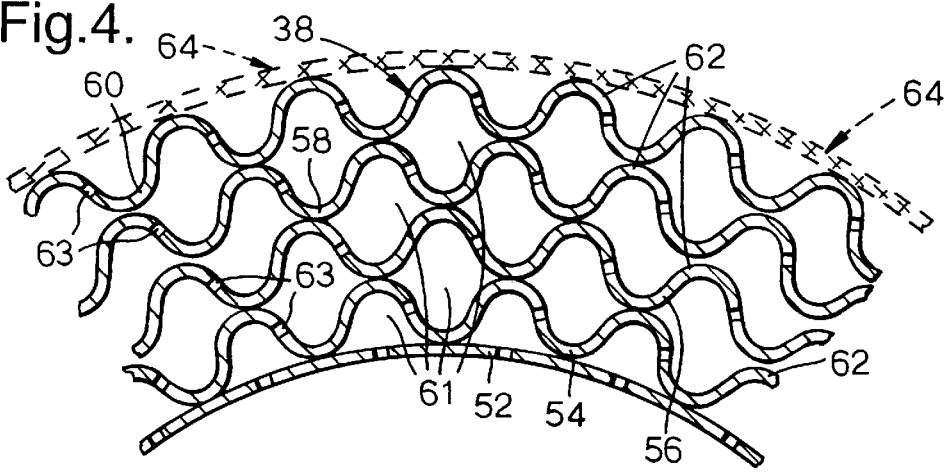
FIG. 4 is a cross-sectional view in the direction of arrows A—A in FIG. 3.
Figure 5:
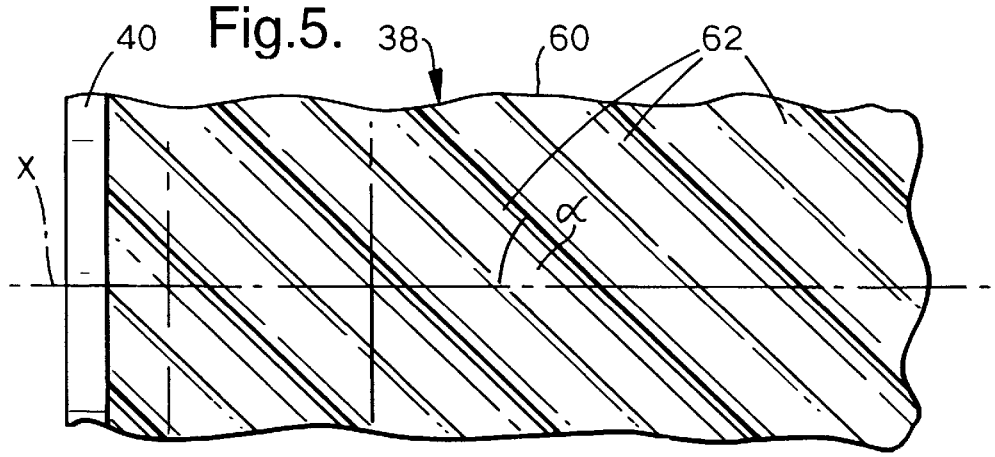
FIG. 5 is a view in the direction of arrow B in FIG. 3.
Figure 6:
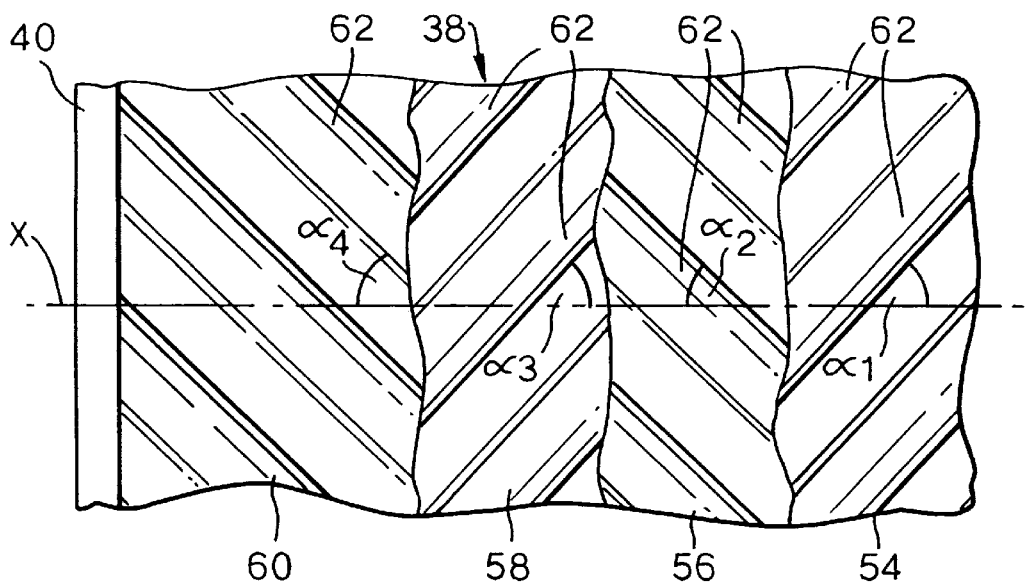
FIG. 6 is a cut away view in the direction of arrow C in FIG. 3.
Figure 7:
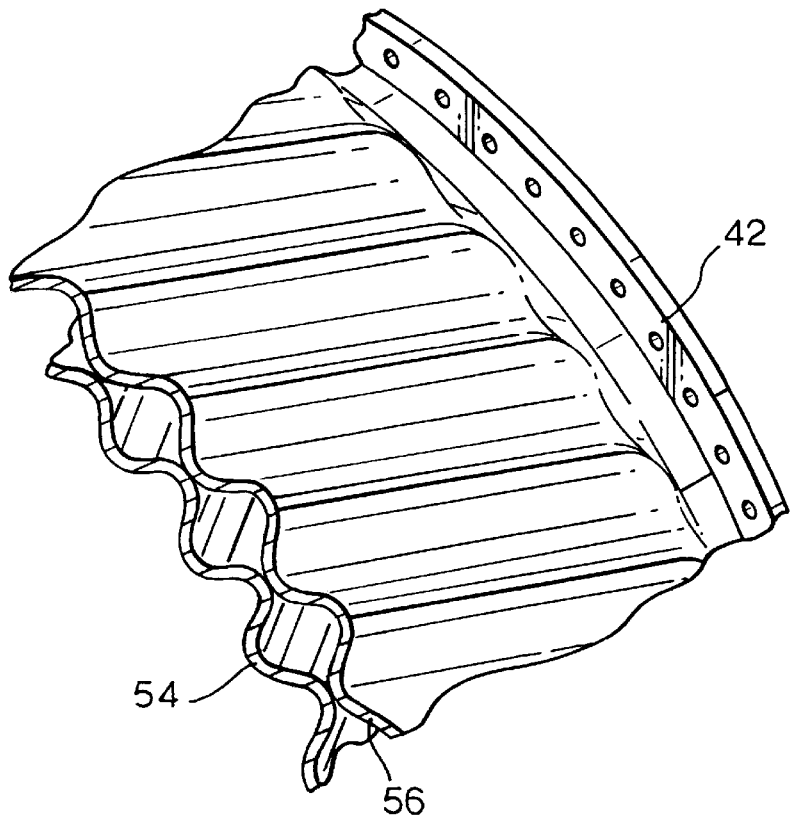
FIG. 7 is a cut away perspective view of the fan blade containment assembly shown in FIG. 3, showing two of the corrugated metal rings.

The fan blade containment assembly 38, as shown more clearly in FIGS. 3 and 4, comprises a relatively thin metallic cylindrical, or frustoconical, casing 52 and a plurality of relatively thin corrugated metallic sheets 54, 56, 56',58 and 60. The thin corrugated metallic sheet 54 is wound into a ring around the casing 52 and the circumferential ends of the thin corrugated metallic sheet 54 are joined together by suitable means, for example welding, brazing, nuts and bolts or other mechanical fasteners. Similarly the thin corrugated metallic sheets 56,56',58 and 60 in turn are wound around the casing 52 and the respective ends of the thin corrugated metallic sheets are joined together to form substantially concentric rings. The axial ends of the thin corrugated metallic sheets 54, 56, 56', 58 and 60 are joined to each other and the casing 52 by welding or other suitable means or retained by band clamps. The axial ends of the casing 52 are provided with the flanges 40 and 42. The thin corrugated metallic sheets 54, 56, 56' 58 and 60 are arranged to abut each other at axially and circumferentially spaced locations where the corrugations 62 contact. The thin corrugated metallic sheets 54, 56, 56', 58 and 60 are spot welded, or seam welded, together at the spaced locations where the corrugations 62 contact to improve the rigidity, or integrity, of the fan blade containment assembly 38. The corrugations 62 of the thin corrugated metallic sheets 54, 56, 56', 58 and 60 are shown more clearly in FIGS. 4, 5, 6 and 7.

In some circumstances the welds between the corrugations 62 of the thin corrugated metallic sheets 54, 56,56', 58 and 60 may not be required.

The corrugations 62 of the thin corrugated metallic sheets 54, 56,56', 58 and 60 are arranged to extend with both axial and circumferential components. Additionally the corrugations 62 on the adjacent thin corrugated metallic sheets 54, 56,56', 58 and 60 are arranged at different angles. For example the corrugations 62 on metallic sheet 54 are arranged at an angle to the axis X of the gas turbine engine 10. The corrugations 62 on the metallic sheet 56 are arranged at angle 2 to the axis X of the gas turbine engine 10. The corrugations 62 on metallic sheet 58 are arranged at an angle 3 to the axis X of the gas turbine engine 10 and the corrugations 62 on the metallic sheet 60 are arranged at angle 4 to the axis X of the gas turbine engine 10. The angles , 2, 3 and 4 are the same, 45° in this example, but angles and 3 are in the opposite direction to angles 2 and 4. It would of course be possible to use any suitable combinations of angles , 2, 3 and 4.

The thin casing 52 and the thin corrugated metallic sheets 54, 56,56', 58 and 60 are provided with apertures 63 to provide acoustic attenuation of sounds generated in the gas turbine engine 10. The corrugations 62 of the thin corrugated metallic sheets 54, 56,56', 58 and 60 define spaces 61 therebetween and the spaces 61 may be filled with an energy absorbing material, for example foam, to further increase the energy absorbing capability of the fan blade containment assembly 38.

It may be desirable in some circumstances to provide a number of continuous layers of a strong fibrous material 64 wound around the thin corrugated metallic sheets 54, 56,56', 58 and 60 to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the thin corrugated metallic sheets 54, 56,56',58 and 60 and the continuous layers of fibrous material 64.

Figure 8:
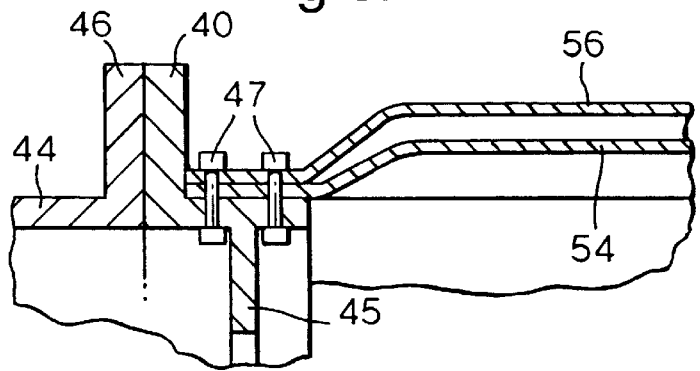
FIG. 8 is a cross-sectional view of an alternative attachment of the fan blade containment assembly to the fan casing.

FIG. 8 shows an attachment of the fan blade containment assembly 38 to the flanges 40 and 42. The axial ends of the thin metallic sheets 54, 56,56', 58 and 60 are mechanically fastened by nuts and bolts 47 to the flanges 40 and 42. However, welding, brazing or other suitable fastening may be used. It is to be noted that a fence, or hook, 45 is provided on the flange 40 to prevent forward movement of the tip of the fan blades 34 in the event of a fan blade off situation.

Figure 9:
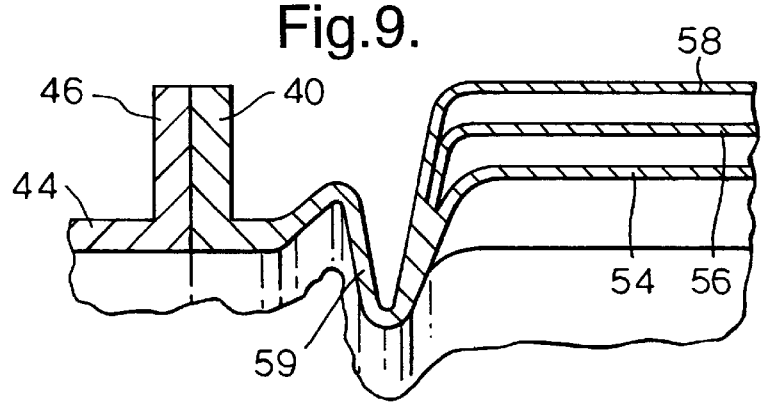
FIG. 9 is a cross-sectional view of a further attachment of the fan blade containment assembly to the fan casing.

FIG. 9 shows a corrugation 59 extending with a purely circumferential component at the upstream end of the fan blade containment assembly 38 to attach the fan blade containment assembly 38 to the flange 40.

Figure 10:
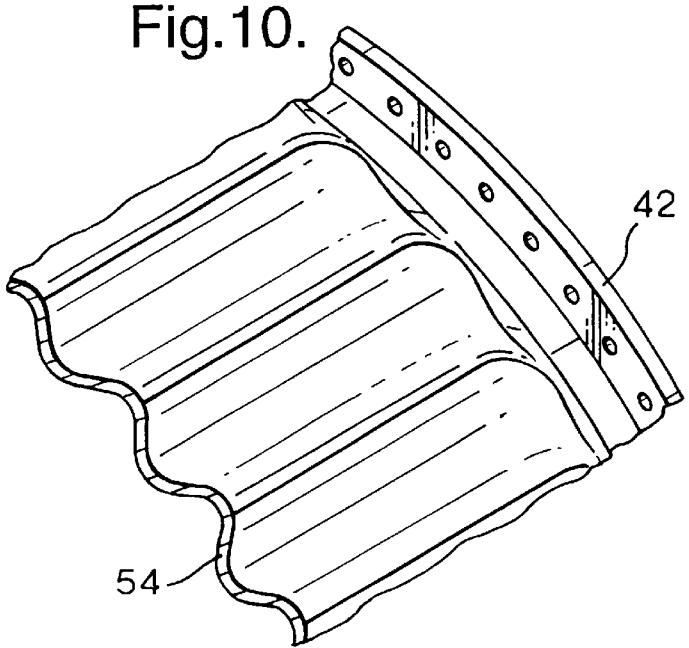
FIG. 10 is a cut away perspective view of a single sheet fan blade containment assembly according to the present invention.

FIG. 10 shows a single thin corrugated metallic sheet wound into a ring to form the fan blade containment assembly 38. The corrugations 62 extend with both axial and circumferential components. It may be possible to arrange the corrugations 62 to extend with purely an axial component or purely a circumferential component.

Figure 11:
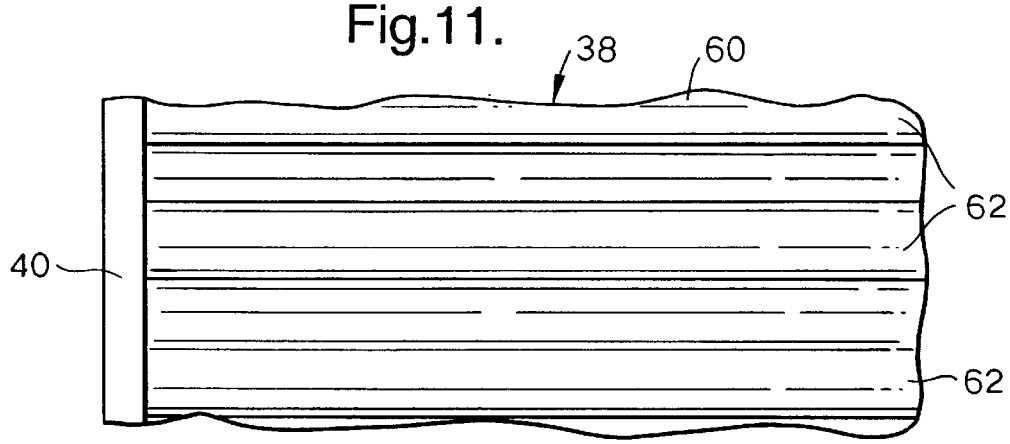
FIG. 11 is an alternative view in the direction of arrow B in FIG. 3.

FIG. 11 shows an alternative view of the fan blade containment assembly 38 in which the thin corrugated metallic sheet 60 has the corrugations extending with a pure axial component. But one or more of the thin corrugated metallic sheets 54, 56, 56', and 58 may have corrugations 62 extending with both circumferential and axial components, with purely circumferential components or with purely axial components.

Figure 12:
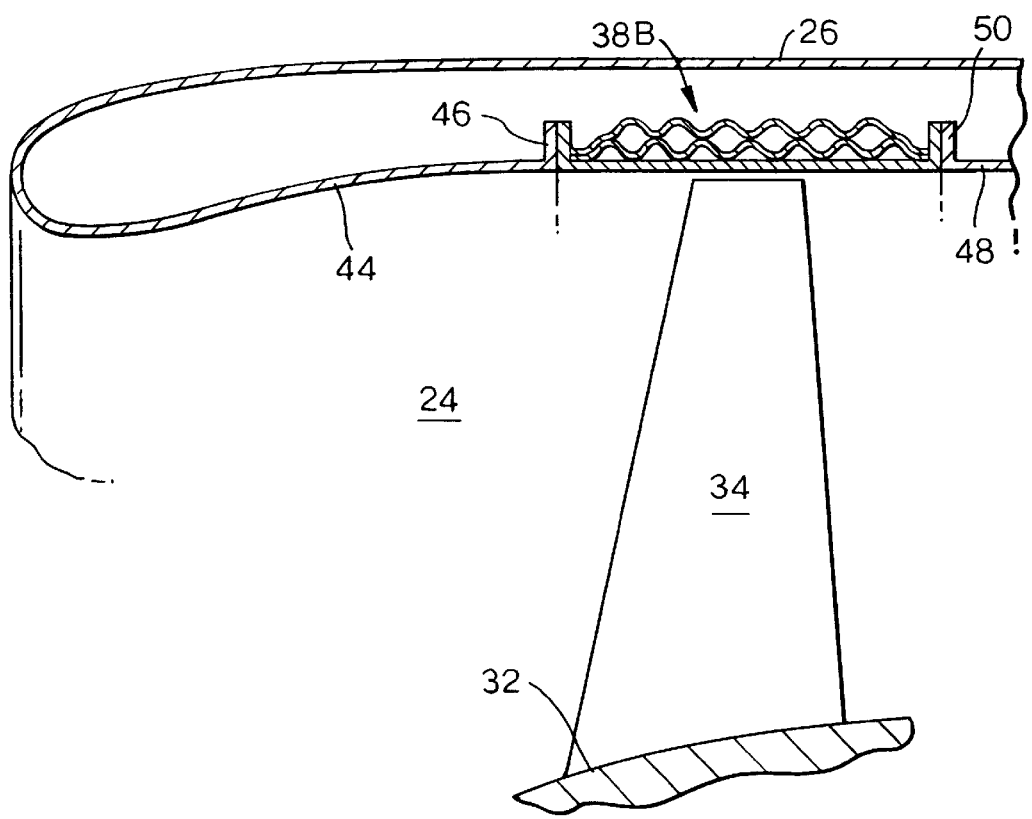
FIG. 12 is an enlarged view of an alternative fan blade containment assembly shown in FIG. 1.
Figure 13:
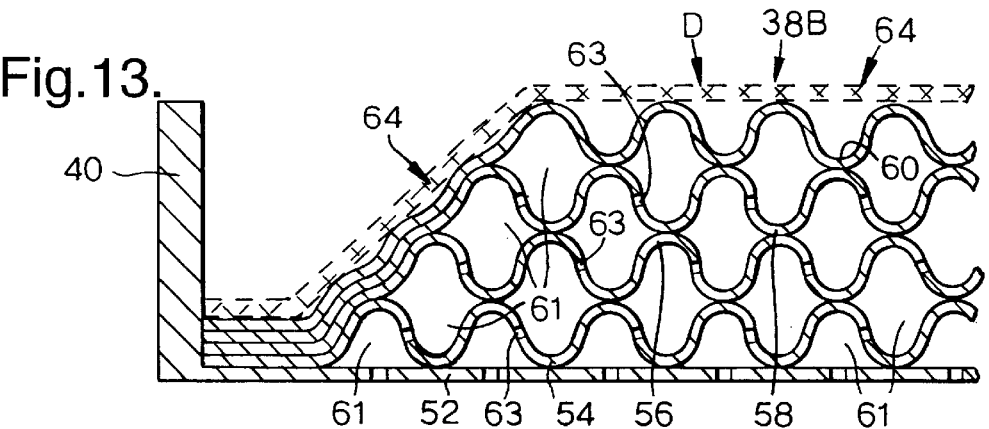
FIG. 13 is a further enlarged view of the fan blade containment assembly shown in FIG. 12.
Figure 14:
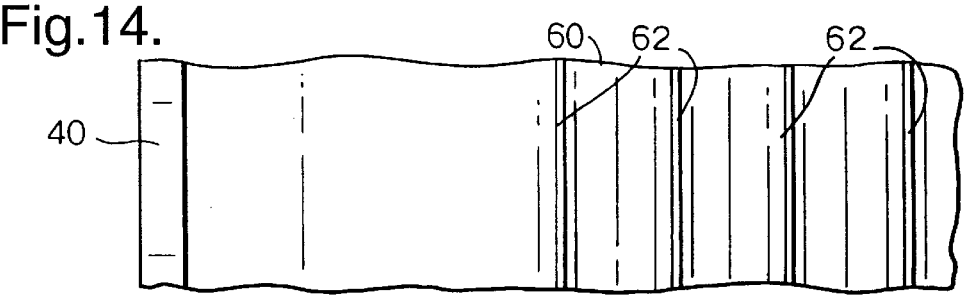
FIG. 14 is a view in the direction of arrow D in FIG. 13.

FIGS. 12, 13 and 14 show an alternative fan blade containment assembly 38B which comprises a relatively thin metallic cylindrical, or frustoconical, casing 52 and a plurality of, four, relatively thin corrugated metallic sheets 54, 56,56', 58 and 60. The thin corrugated metallic sheet 54 is wound into a ring around the casing 52 and the circumferential ends of the thin corrugated metallic sheet 54 are joined together by suitable means, for example welding, brazing, nuts and bolts or other mechanical fasteners. Similarly the thin corrugated metallic sheets 56,56', 58 and 60 in turn are wound around the casing 52 and the respective circumferential ends of the thin corrugated metallic sheets are joined together to form substantially concentric rings. The axial ends of the thin corrugated metallic sheets 54, 56, 56',58 and 60 are joined to each other and the casing 52 by welding or other suitable means or retained by band clamps. The axial ends of the casing 52 are provided with the flanges 40 and 42. The thin corrugated metallic sheets 54, 56,56', 58 and 60 are arranged to abut each other at axially and circumferentially spaced locations where the corrugations 62 contact. The thin corrugated metallic sheets 54, 56, 58 and 60 are spot welded, or seam welded, together at the spaced locations where the corrugations 62 contact to improve the rigidity, or integrity, of the fan blade containment assembly 38. The corrugations 62 of the thin corrugated metallic sheets 54, 56,56', 58 and 60 are shown more clearly in FIGS. 13 and 14.

The corrugations 62 of the thin corrugated metallic sheets 54, 56,56', 58 and 60 are arranged to extend with pure circumferential components.

The thin casing 52 and the thin corrugated metallic sheets 54, 56,56', 58 and 60 are provided with apertures 63 to provide acoustic attenuation of sounds generated in the gas turbine engine 10. The corrugations 62 of the thin corrugated metallic sheets 54, 56,56', 58 and 60 define spaces 61 therebetween and the spaces 61 may be filled with an energy absorbing material, for example foam, to further increase the energy absorbing capability of the fan blade containment assembly 38B.

It may be desirable in some circumstances to provide a number of continuous layers of a strong fibrous material 64 wound around the thin corrugated metallic sheets 54, 56,56', 58 and 60 to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the thin corrugated metallic sheets 54, 56,56', 58 and 60 and the continuous layers of fibrous material 64.

The thin casing 52 and the thin corrugated metallic sheets 54, 56,56', 58 and 60 have a thickness of about 1–3 mm, preferably 2 mm, compared to the conventional thickness of 12 mm for a fan blade containment casing. This enables the weight of the fan blade containment assembly to be reduced. Additionally it may allow the use of the fibrous material for fan blade containment to be dispensed with.

In operation of the gas turbine engine 10, in the event that a fan blade 34, or a portion of a fan blade 34, becomes detached it pierces the thin metallic casing 52, before it encounters the thin corrugated metallic sheets 54, 56,56', 58 and 60. The thin corrugated metallic sheets 54, 56,56', 58 and 60 are impacted by the fan blade 34, or portion of the fan blade 34, and effectively remove energy from the fan blade 34, or portion of the fan blade 34.

Each of the thin corrugated metallic sheets 54, 56,56', 58 and 60 has relatively low mass and hence low inertia. This allows the thin corrugated metallic sheets 54, 56,56', 58 and 60 to move with the detached fan blade 34, or portion of the fan blade 34. This movement spreads the impact energy over a larger area of the fan blade containment assembly 38 enabling the use of a lower mass of material to contain the detached fan blade 34, or portion of the fan blade 34.

The detached fan blade 34, or portion of the fan blade 34, causes the corrugations 62 in the thin corrugated metallic sheets 54, 56,56', 58 and 60 to be straightened out and this process absorbs energy from the detached fan blade 34 or portion of the fan blade 34. As the corrugations 62 are straightened out sequentially in the adjacent thin corrugated metallic sheets 54, 56,56', 58 and 60, the adjacent thin metallic sheets 54, 56,56', 58 and 60 slide over each other and absorb more energy from the fan blade 34 by friction between the adjacent thin corrugated metallic sheets 54, 56,56', 58 and 60. As the corrugations 62 are straightened out the welds-between the corrugations 62 on adjacent thin corrugated metallic sheets 54, 56,56', 58 and 60 are broken, this also absorbs more energy. As each thin corrugated metallic sheet 54, 56,56', 58 and 60 is straightens over the impact region it stiffens locally and transfers load to material further from the impact region, this increases the proportion of the fan blade containment assembly 38 contributing to energy absorption.

Figure 15:
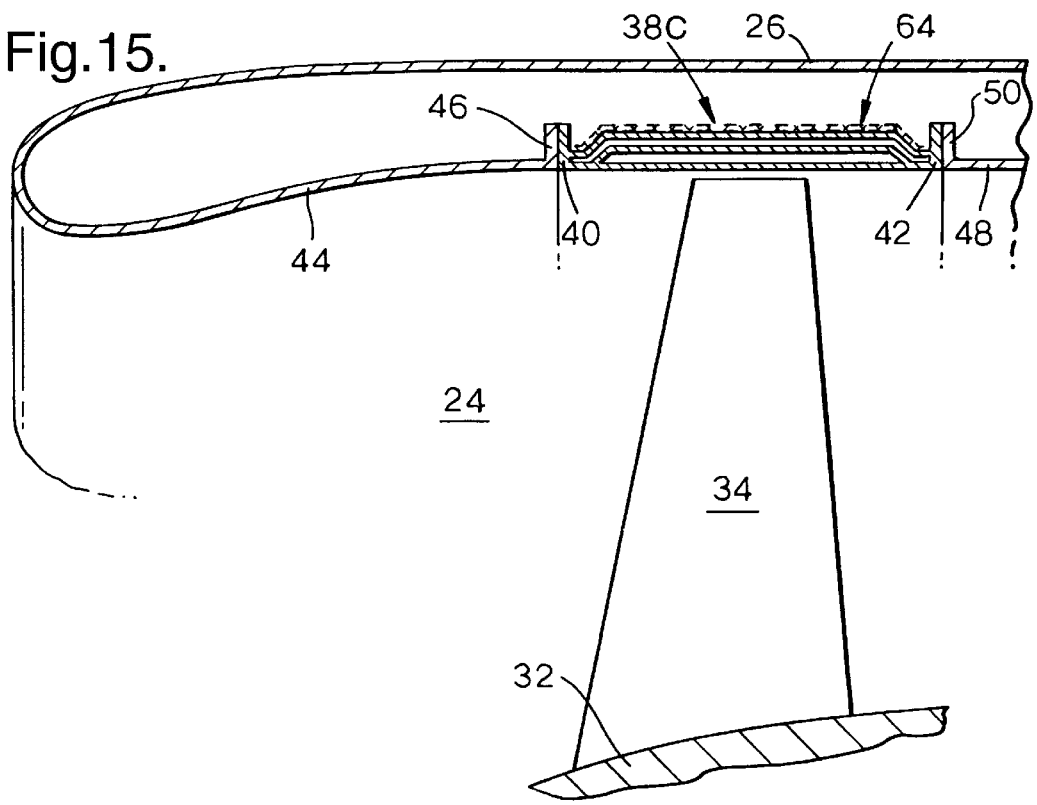
FIG. 15 is a further enlarged view of the fan blade containment assembly shown in FIG. 1.
Figure 16:
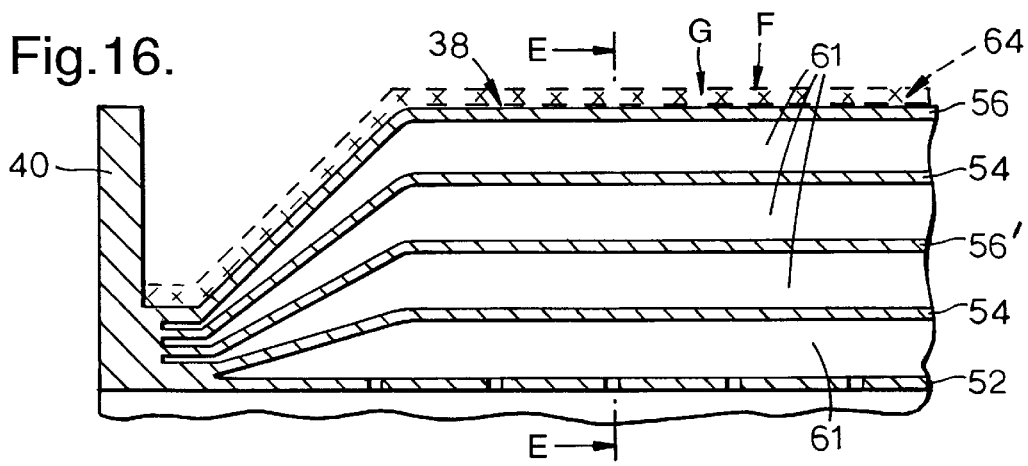
FIG. 16 is a further enlarged view of the fan blade containment assembly shown in FIG. 15.
Figure 17:
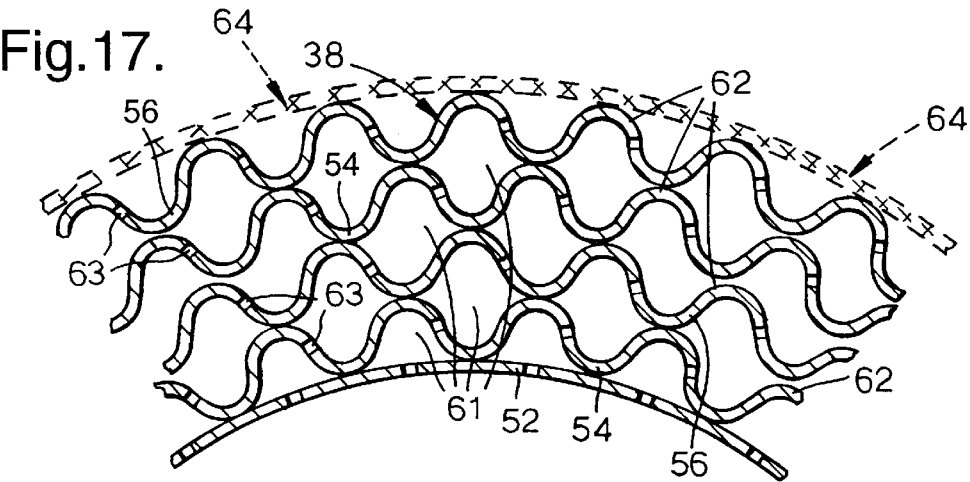
FIG. 17 is a cross-sectional view in the direction of arrows E—E in FIG. 16.
Figure 18:
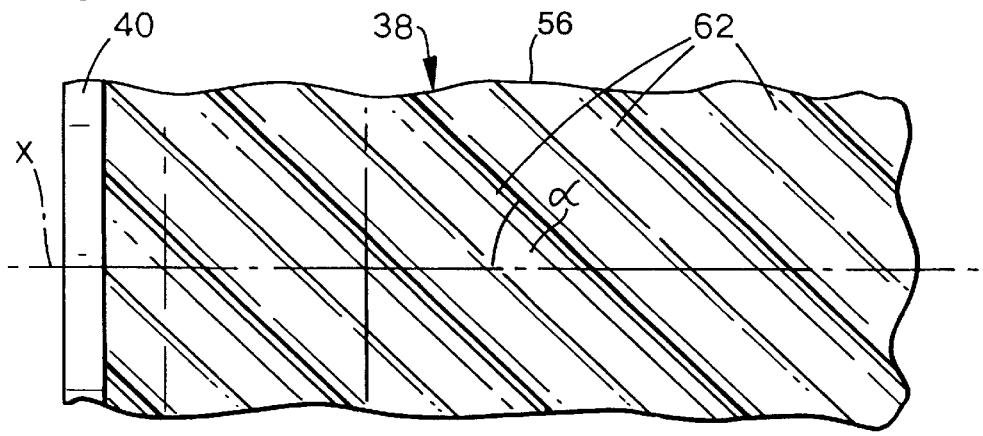
FIG. 18 is a view in the direction of arrow F in FIG. 16.
Figure 19:
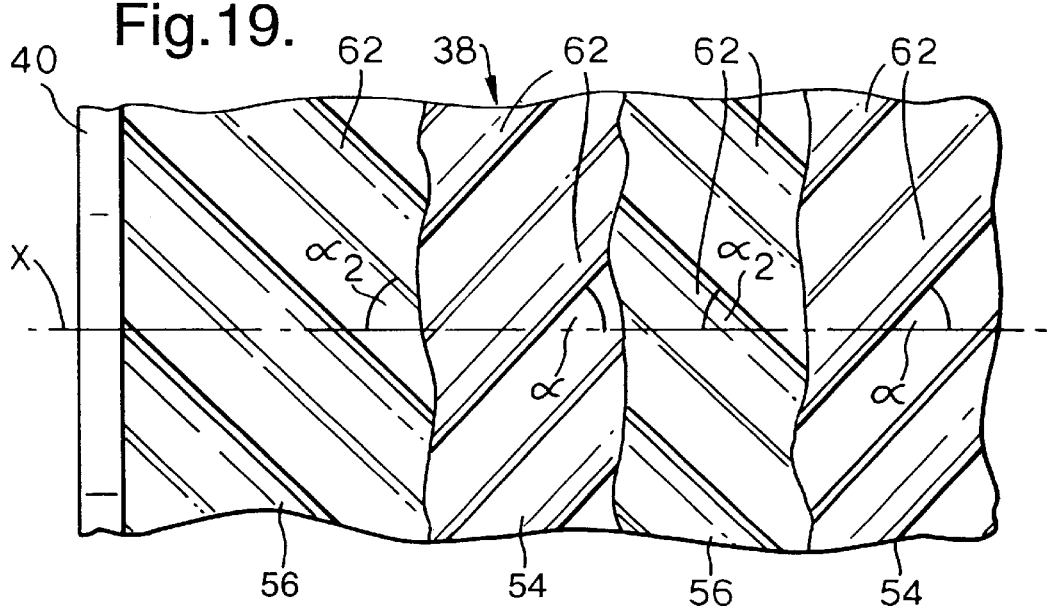
FIG. 19 is a cut away view in the direction of arrow G in FIG. 16.
Figure 20:
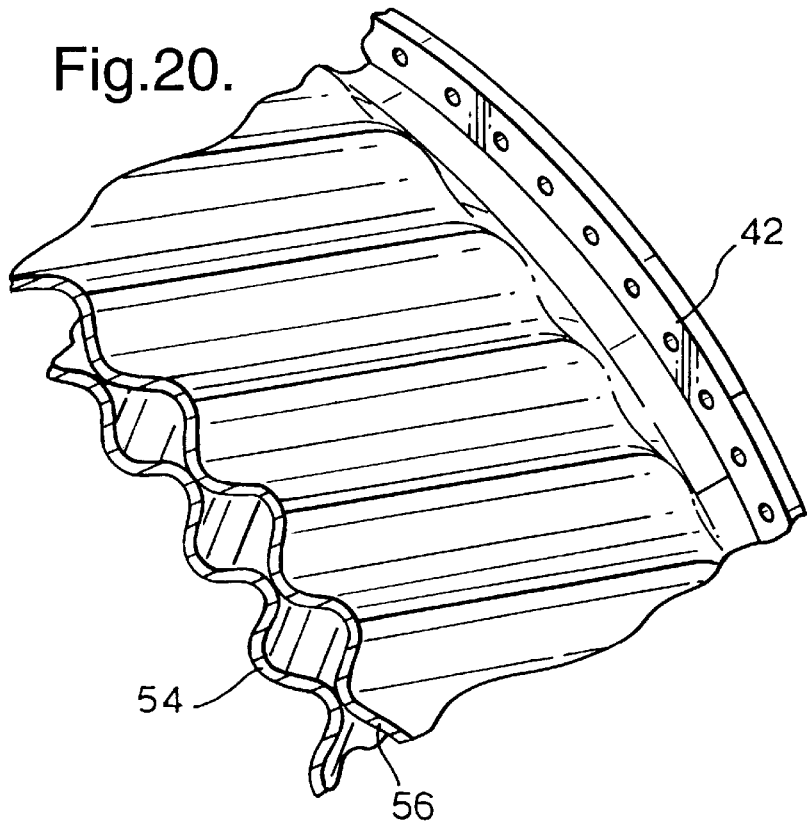
FIG. 20 is a cut away perspective view of the fan blade containment assembly shown in FIG. 16.

The fan blade containment assembly 38C, as shown more clearly in FIGS. 15 and 20, comprises a relatively thin metallic cylindrical, or frustoconical, casing 52 and a plurality of, two in this example, relatively thin corrugated metallic sheets 54 and 56,56'. The thin corrugated metallic sheets 54 and 56,56' are wound together into spirals around the casing 52 and the circumferential ends of the thin corrugated metallic sheet 54 and 56,56' are joined to the casing 52 by for example welding, brazing, nuts and bolts or other mechanical fasteners. The thin corrugated metallic sheets 54 and 56,56' are wound around the thin metallic casing 52 more than once, preferably a number of times. The axial ends of the thin corrugated metallic sheets 54 and 56,56' are joined to each other and the casing 52 by welding or other suitable means or retained by band clamps. The axial ends of the casing 52 are provided with the flanges 40 and 42. The thin corrugated metallic sheets 54 and 56,56' are arranged to abut each other at circumferentially and axially spaced locations where the corrugations 62 contact. The thin corrugated metallic sheets 54 and 56,56' are spot welded, or seam welded, together at the spaced locations where the corrugations 62 contact to improve the rigidity or integrity of the fan blade containment assembly 38. The corrugations 62 of the thin corrugated metallic sheets 54 and 56,56' are shown more clearly in FIGS. 17, 18, 19 and 20.

In some circumstances the welds between the corrugations 62 of the thin corrugated metallic sheets may not be required.

The corrugations 62 of the thin corrugated metallic sheets 54 and 56,56' are arranged to extend with both axial and circumferential components. Additionally the corrugations 62 on the adjacent thin corrugated metallic sheets 54 and 56,56' are arranged at different angles. For example the corrugations 62 on metallic sheet 54 are arranged at an angle to the axis X of the gas turbine engine. The corrugations 62 on metallic sheets 56, 56' are arranged at an angle 2 to the axis X of the gas turbine engine. The angles and 2 are the same, 45° in this example, but angles and 2 are in the opposite directions. It would of course be possible to use any suitable combinations of angles and 2, but at least one of the thin metallic sheets 54 and 56,56' must be arranged to have a component in the circumferential direction.

The thin casing 52 and the thin corrugated metallic sheets 54 and 56, 56' are provided with apertures 63 to provide acoustic attenuation of sounds generated in the gas turbine engine 10. The corrugations 62 of the thin corrugated metallic sheets 54 and 56,56' defines spaces 61 therebetween and the spaces 61 may be filled with an energy absorbing material, for example foam, to further increase the energy absorbing capability of the fan blade containment assembly 38.

It may be desirable in some circumstances to provide a number of continuous layers of a strong fibrous material 64 wound around the thin corrugated metallic sheets 54 and 56, 56' to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the thin corrugated metallic sheets 54 and 56,56' and the continuous layers of fibrous material 64.

Figure 21:
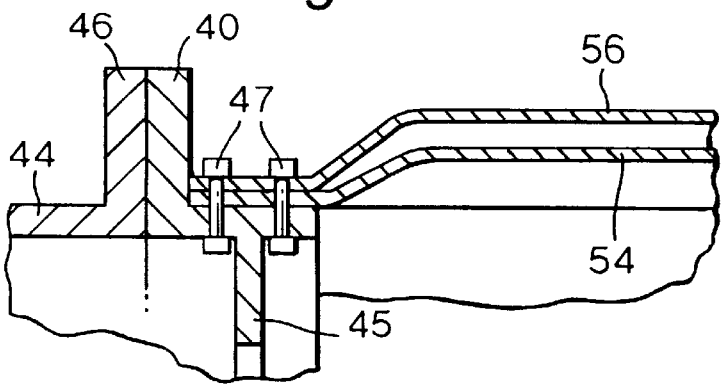
FIG. 21 is a cross-sectional view of an alternative attachment of the fan blade containment assembly to the fan casing.

FIG. 21 shows an attachment of the fan blade containment assembly 38 to the flanges 40 and 42. The edges of the thin metallic sheets 54 and 56,56' are mechanically fastened by nuts and bolts 47 to the flanges 40 and 42. However, welding, brazing or other suitable fastening may be used. It is to be noted that a fence, or hook, 45 is provided on the flange 40 to prevent forward movement of the tip of the fan blades 34 in the event of a fan blade off situation.

Figure 22:
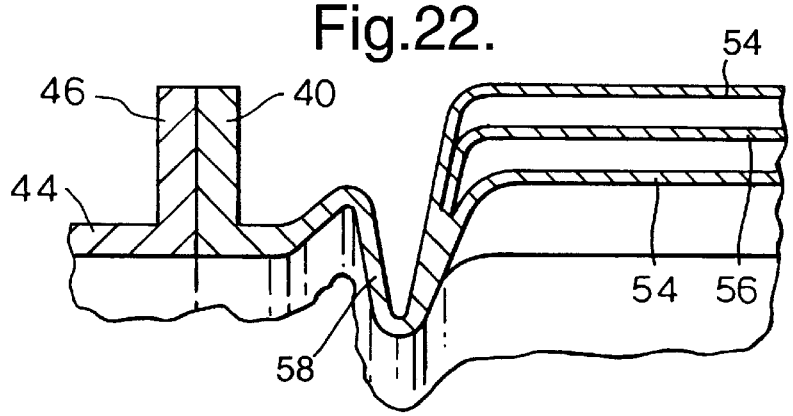
FIG. 22 is a cross-sectional view of a further attachment of the fan blade containment assembly to the fan casing.

FIG. 22 shows a corrugation 58 extending with a purely circumferential component at the upstream end of the fan blade containment assembly 38 to attach the fan blade containment assembly 38 to the flange 40.

Figure 23:
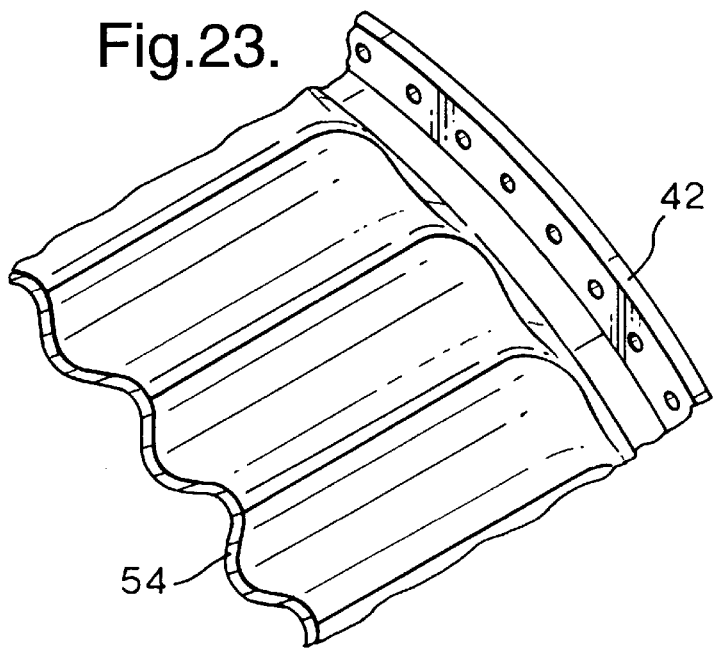
FIG. 23 is a cut away perspective view of the single sheet fan blade containment assembly according to the present invention.

FIG. 23 shows a single thin corrugated metallic sheet wound into a spiral to form the fan blade containment assembly 38. The corrugations 62 extend with at least a circumferential component.

Figure 24:
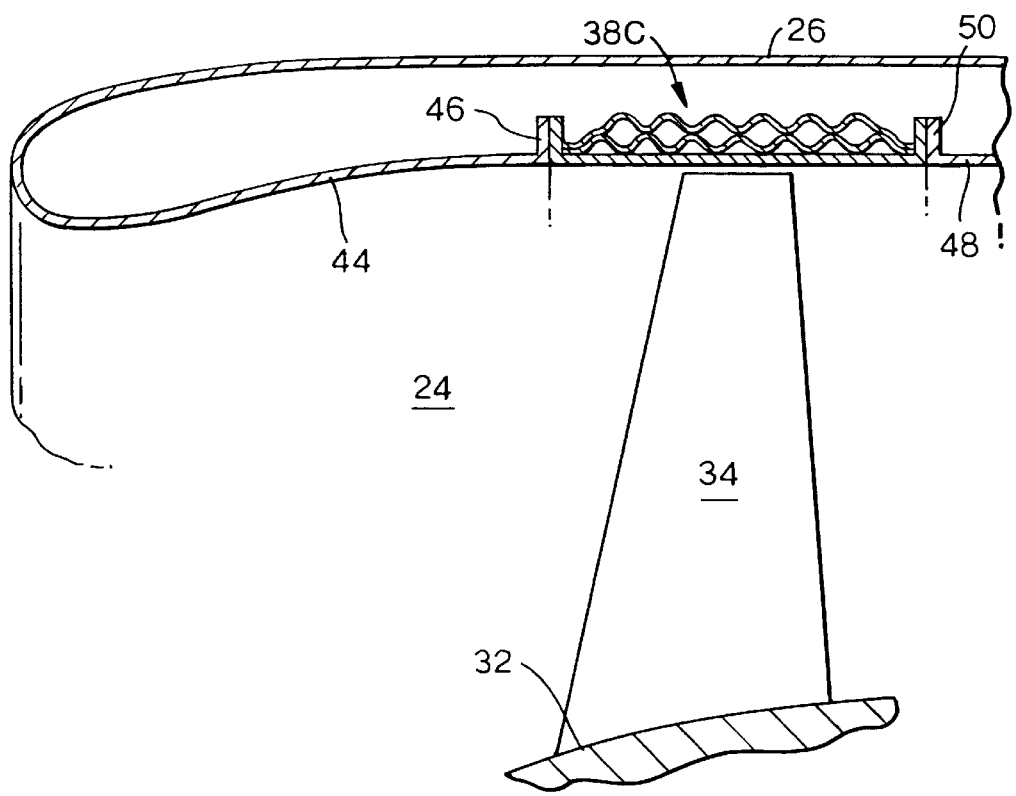
FIG. 24 is an alternative view in the direction of arrow F in FIG. 16.
Figure 25:
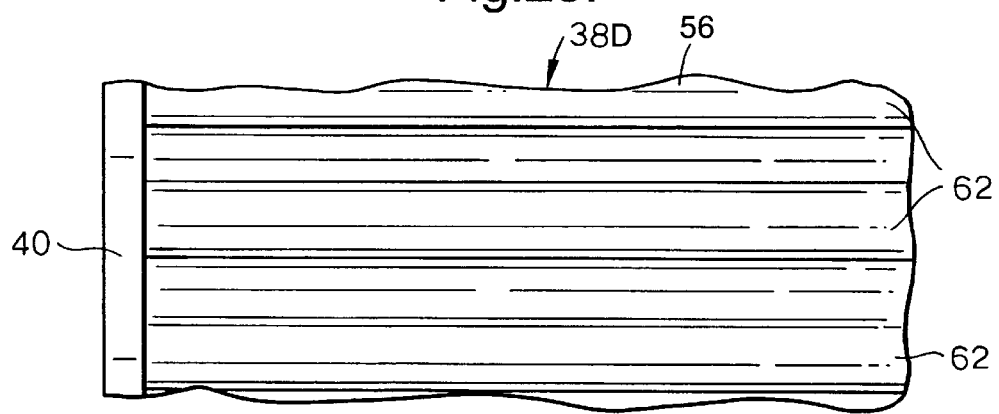
FIG. 25 is an enlarged view of an alternative fan blade containment assembly shown in FIG. 1.

FIG. 24 shows an alternative view of the fan blade containment assembly 38 in which the thin corrugated metallic sheet 56 has the corrugation 62 extending with a pure axial component, but the thin corrugated metallic sheet 52 has corrugations 62 extending with both circumferential and axial components.

Figure 26:
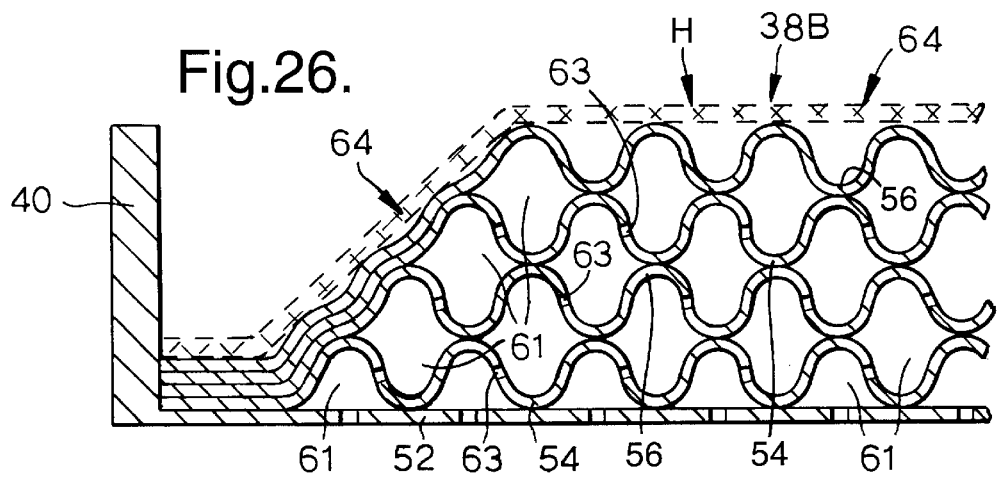
FIG. 26 is a further enlarged view of the fan blade containment assembly shown in FIG. 25.
Figure 27:
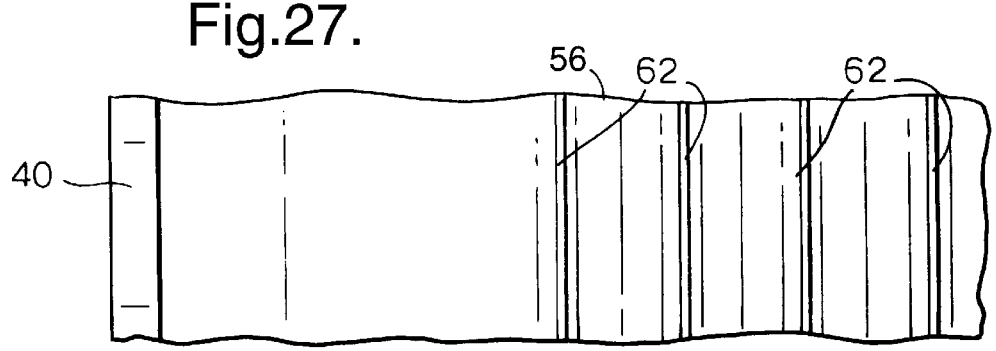
FIG. 27 is a view in the direction of arrow H in FIG. 26.

FIGS. 26 and 27 show an alternative fan blade containment assembly 38D which comprises a relatively thin metallic cylindrical, or frustoconical, casing 52 and a plurality of, two, relatively thin corrugated metallic sheets 54 and 56. The thin corrugated metallic sheets 54 and 56,56' are wound around the thin metallic casing 52 at least once, preferably a number of times. The thin corrugated metallic sheets 54 and 56,56' are wound together into spirals around the casing 52 and the ends of the thin corrugated metallic sheet 54 and 56,56' are joined to the casing 52 by for example welding, brazing, nuts and bolts or other mechanical fasteners. The axial ends of the thin corrugated metallic sheets 54 and 56,56' are joined to each other and the casing 52 by welding or other suitable means or retained by band clamps. The axial ends of the casing 52 are provided with the flanges 40 and 42. The thin corrugated metallic sheets 54 and 56,56' are arranged to abut each other at circumferentially and axially spaced locations where the corrugations 62 contact. The thin corrugated metallic sheets 54 and 56,56' are spot welded, or seam welded, together at the spaced locations where the corrugations 62 contact. This improves the rigidity or integrity of the fan blade containment assembly 38. The corrugations 62 of the thin corrugated metallic sheets 54 and 56,56' are shown more clearly in FIG. 27.

The corrugations 62 of the thin corrugated metallic sheets 54 and 56 are arranged to extend with pure circumferential components.

The thin casing 52 and the thin corrugated metallic sheets 54 and 56,56' are provided with apertures 61 to provide acoustic attenuation of sounds generated in the gas turbine engine 10. The corrugations 62 of the thin corrugated metallic sheets 54 and 56,56' defines spaces 61 therebetween and the spaces 61 may be filled with an energy absorbing material, for example foam, to further increase the energy absorbing capability of the fan blade containment assembly 38.

It may be desirable in some circumstances to provide a number of continuous layers of a strong fibrous material 64 wound around the thin corrugated metallic sheets 54 and 56, 56' to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the thin corrugated metallic sheets 54 and 56,56' and the continuous layers of fibrous material 64.

The thin casing 52 and the thin corrugated metallic sheets 54 and 56,56' have a thickness of about 1–3 mm, preferably 2 mm, compared to the normal thickness of 12 mm for a fan blade containment casing. This enables the weight of the fan blade containment assembly to be reduced. Additionally it may allow the use of the fibrous material containment to be dispensed with.

In operation of the gas turbine engine 10, in the event that a fan blade 34, or a portion of a fan blade 34, becomes detached it pierces the thin metallic casing 52, before encountering the thin corrugated metallic sheets 54 and 56, 56'. The thin corrugated metallic sheets 54 and 56 are impacted by the fan blade 34, or portion of the fan blade 34, and effectively remove energy from the fan blade 34, or portion of the fan blade 34.

Each of the turns of the thin corrugated metallic sheets 54 and 56 has relatively low mass and hence relatively low inertia. This allows the thin corrugated metallic sheets 54 and 56, 56' to move with the detached fan blade 34, or portion of the fan blade 34. This movement spreads the impact energy over a larger area of the fan blade containment assembly 38 enabling the use of lower mass of material to contain the detached fan blade 34, or fan blade portion 34.

The detached fan blade 34, or portion of the fan blade 34, causes the corrugations 62 in the thin corrugated metallic sheets 54 and 56,56' to be straightened out and this process absorbs energy from the detached fan blade 34 or portion of a fan blade 34. As the corrugations 62 are straightened out in each turn of the thin corrugated metallic sheets 54 and 56,56', the adjacent thin corrugated metallic sheets 54 and 56, 56' slide over each other and absorb more energy from the fan blade 34 by friction between the adjacent thin corrugated metallic sheets 54 and 56,56'. As the corrugations 63 are straightened the welds between corrugations 62 on adjacent thin corrugated metallic sheets 54 and 56,56' are broken also absorbing energy. As each turn of the thin corrugated metallic sheets 54 and 56,56' straightens over the impact region it stiffens locally and transfers load to material further from the impact region, this increases the proportion of the fan blade assembly 38 contributing to energy absorption.

The corrugations lead to a low-density structure with a greater stiffness to weight ratio than a solid casing of the same material.

The orientation of the corrugations relative to the axis of the gas turbine engine allows the elongation axially and circumferentially to be adjusted to an optimum for fan blade containment.

The use of a plurality of thin corrugated metallic sheets with the corrugations arranged at different angles to the axis of the gas turbine engine to increase the torsional rigidity of the fan blade containment assembly and/or to ensure consistent spacing between the thin corrugated metallic sheets. The use of a plurality of thin corrugated metallic sheets provides high integrity through the alternative load paths and hence damage tolerance.

The thin corrugated metallic sheets are easy to produce by passing thin metallic sheets through shaped rollers to form the corrugations.

The thin metallic sheet may be lower cost material because defects are easier to detect in then metallic sheets and/or the defects have less significance due to the multiple rings of the thin corrugated metallic sheet(s).

The thin corrugated metallic sheets may be manufactured from titanium, titanium alloy, aluminium, aluminium alloy, nickel, nickel alloy, titanium aluminide, nickel aluminide or steel.

The spacing between the corrugations and the radial height of the corrugations in the thin corrugated metallic sheets is selected to provide optimum energy absorption.

The invention has been described with reference to a fan blade containment assembly, however it is equally applicable to a compressor blade containment assembly and a turbine blade containment assembly.

Although the description has referred to the use of corrugated metallic sheets arranged concentrically around a thin metallic casing in some circumstances the thin metallic casing may not be required.

We claim:

1. A gas turbine engine blade containment assembly comprising a generally cylindrical, or frustoconical casing having a central axis, the casing surrounding a rotor carrying a plurality of radially extending rotor blades, at least one corrugated metal sheet wound into a spiral surrounding the casing, wherein the corrugations of the at least one corrugated metal sheet wound into a spiral extend in a circumferential direction relative to said central axis.

2. A gas turbine engine blade containment assembly as claimed in claim 1 wherein the casing comprises a single corrugated metal sheet wound into a spiral.

3. A gas turbine engine blade containment assembly as claimed in claim 1 wherein the casing comprises a plurality of corrugated metal sheets, each of which is wound into a spiral.

4. A gas turbine engine blade containment assembly as claimed in claim 3 wherein the corrugations in different corrugated metal sheets are arranged to extend at different angles.

5. A gas turbine engine blade containment assembly as claimed in claim 4 wherein the corrugations in a first corrugated metal sheet are arranged to extend with solely circumferential components and the corrugations in a second corrugated metal sheet are arranged to extend with solely axial components.

6. A gas turbine engine containment assembly as claimed in claim 4 wherein the corrugations in a first corrugated metal sheet are arranged to extend with solely circumferential components and the corrugations in a second corrugated metal sheet are arranged to extend with both axial and circumferential components.

7. A gas turbine engine blade containment assembly as claimed in claim 4 wherein the corrugations in a first corrugated metal sheet are arranged to extend with both axial and circumferential components and the corrugations in a second corrugated metal sheet are arranged to extend with both axial and circumferential components.

8. A gas turbine engine blade containment assembly as claimed in claim 3 wherein the plurality of corrugated metal sheets wound into spirals define spaces therebetween, the spaces are filled with an energy absorbing material to increase the blade containment capability of the casing.

9. A gas turbine engine blade containment assembly comprising a generally cylindrical, or frustoconical casing having a central axis, the casing surrounding a rotor carrying a plurality of radially extending rotor blades, at least one corrugated metal sheet ring surrounding the casing, wherein the corrugations of the at least one corrugated sheet metal ring extend in an axial and/or circumferential direction relative to said central axis.

10. A gas turbine engine blade containment assembly as claimed in claim 1 or 9 wherein the casing is a fan casing and the rotor blades are fan blades.

11. A gas turbine engine blade containment assembly as claimed in claim 1 or 9 wherein the casing is a turbine casing and the rotor blades are turbine blades.

12. A gas turbine engine blade containment assembly as claimed in claim 1 or 9 wherein the corrugations are equally spaced.

13. A gas turbine engine blade containment assembly as claimed in claim 9 wherein the corrugations in the at least one corrugated metal sheet extend with solely axial components.

14. A gas turbine engine blade containment assembly as claimed in claim 9 wherein the corrugations in the at least one corrugated metal sheet extend with solely circumferential components.

15. A gas turbine engine blade containment assembly as claimed in claim 9 wherein the corrugations in the at least one corrugated metal sheet extend with both axial and circumferential components.

16. A gas turbine engine blade containment assembly as claimed in claim 9 wherein the casing comprises a single corrugated metal sheet wound into a ring.

17. A gas turbine engine blade containment assembly as claimed in claim 9 wherein the casing comprises a plurality of corrugated metal sheets, each of which is wound into a ring.

18. A gas turbine engine blade containment assembly as claimed in claim 17 wherein the corrugations in different corrugated metal sheets are arranged to extend at different angles.

19. A gas turbine engine blade containment assembly as claimed in claim 18 wherein the corrugations in a first corrugated metal sheet are arranged to extend with solely axial components and the corrugations in a second corrugated metal sheet are arranged to extend with solely circumferential components.

20. A gas turbine engine blade containment assembly as claimed in claim 18 wherein the corrugations in a first corrugated metal sheet are arranged to extend with solely axial components and the corrugations in a second corrugated metal sheet are arranged to extend with axial and circumferential components.

21. A gas turbine engine blade containment assembly as claimed in claim 18 wherein the corrugations in a first corrugated metal sheet are arranged to extend with solely circumferential components and the corrugations in a second corrugated metal sheet are arranged to extend with axial and circumferential components.

22. A gas turbine engine blade containment assembly as claimed in claim 18 wherein the corrugations in a first corrugated metal sheet are arranged to extend with axial and circumferential components and the corrugations in a second corrugated metal sheet are arranged to extend with axial and circumferential components.

23. A gas turbine engine blade containment assembly as claimed in claim 1 or 9 wherein the at least one corrugated metal sheet is provided with apertures therethrough to attenuate noise.

24. A gas turbine engine blade containment assembly as claimed in claim 17 wherein the plurality of corrugated metal sheets define spaces therebetween, the spaces are filled with a energy absorbing material to increase the blade containment capability of the casing.

25. A gas turbine engine blade containment assembly as claimed in claim 1 or 9 wherein the at least one corrugated metal sheet wound into a spiral defines spaces therebetween, the spaces are filled with an energy absorbing material to increase the blade containment capability of the casing.

26. A gas turbine engine blade containment assembly as claimed in claim 1 or 9 wherein the at least one corrugated metal sheet is formed from the group comprising titanium, an alloy of titanium, aluminum and steel.

* * * * *